(12) United States Patent
Wakou et al.

(10) Patent No.: US 8,972,157 B2
(45) Date of Patent: Mar. 3, 2015

(54) STOP CONTROL SYSTEM FOR INTERNAL COMBUSTION ENGINE

(75) Inventors: Shinichirou Wakou, Saitama-ken (JP); Yoshihisa Tsuchiya, Saitama-ken (JP); Masanobu Eguchi, Saitama-ken (JP); Shinji Yasuno, Saitama-ken (JP); Kanao Kogure, Saitama-ken (JP); Nobuyuki Akahoshi, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 13/421,240

(22) Filed: Mar. 15, 2012

(65) Prior Publication Data
US 2012/0259534 A1 Oct. 11, 2012

(30) Foreign Application Priority Data

Apr. 7, 2011 (JP) ................................. 2011-085431

(51) Int. Cl.
*F02D 28/00* (2006.01)
*F02N 11/08* (2006.01)
*B60H 1/00* (2006.01)

(52) U.S. Cl.
CPC ........ *F02N 11/0818* (2013.01); *B60H 1/00778* (2013.01); *B60H 1/00785* (2013.01);
(Continued)

(58) Field of Classification Search
CPC ............ F02N 11/0818; F02N 11/0833; F02N 11/0837; F02N 11/084; F02N 2200/0804; F02N 2200/122; F02N 2200/08; B60H 1/00785; Y02T 10/48
USPC ....................... 236/44 R, 44 C; 701/112, 113; 123/179.1, 179.3, 179.4; 62/132
See application file for complete search history.

(56) References Cited

U.S. PATENT DOCUMENTS 6,155,061 A * 12/2000 Davis et al. .................. 62/176.6
7,392,838 B2 * 7/2008 Errington et al. ............. 165/204
(Continued)

FOREIGN PATENT DOCUMENTS

JP 2000-219034 A 8/2000
JP 2009-138708 6/2009
(Continued)

OTHER PUBLICATIONS

European Search Report issued Jul. 6, 2012, in counterpart European Patent Application No. 12159553.2.

*Primary Examiner* — Thomas Moulis
*Assistant Examiner* — Elizabeth Hadley
(74) *Attorney, Agent, or Firm* — Mori & Ward, LLP

(57) ABSTRACT

A stop control system for an internal combustion engine, which is capable of restarting the engine automatically stopped, in optimum timing, thereby making it possible to positively prevent occurrence of fogging of window glass of a vehicle compartment and improve fuel economy. The engine is connected to a compressor of an air conditioner. According to the stop control system, during idle stop, window glass temperature is calculated, and according to the calculated window glass temperature, limit humidity below which fogging of the window glass does not occur is set. When determining compartment humidity becomes equal to or higher than the limit humidity, the idle stop is terminated and the engine is restarted. When the weather is rainy or snowy, the determining compartment humidity is corrected. When vehicle compartment temperature is not lower than a first predetermined temperature, the window glass temperature is corrected.

14 Claims, 7 Drawing Sheets

(52) U.S. Cl.
    CPC ..... *F02N11/0833* (2013.01); *F02N 2200/0804* (2013.01); *F02N 2200/122* (2013.01); *Y02T 10/48* (2013.01); *F02N 2200/08* (2013.01)
    USPC ....................................... 701/113; 123/179.3

(56) References Cited

U.S. PATENT DOCUMENTS

| | | | |
|---|---|---|---|
| 7,900,464 B2* | 3/2011 | Aoki et al. | 62/176.6 |
| 8,285,443 B2* | 10/2012 | Akahoshi et al. | 701/36 |
| 8,296,042 B2* | 10/2012 | Xiao et al. | 701/112 |
| 8,838,369 B2* | 9/2014 | Watanabe et al. | 701/112 |
| 2007/0235549 A1* | 10/2007 | Nakajima | 236/44 R |
| 2009/0145141 A1* | 6/2009 | Akahoshi et al. | 62/133 |
| 2010/0138139 A1* | 6/2010 | Gibert et al. | 701/112 |
| 2010/0330895 A1* | 12/2010 | Suetake et al. | 454/75 |
| 2011/0067422 A1* | 3/2011 | Ichishi et al. | 62/176.1 |
| 2012/0215430 A1* | 8/2012 | Watanabe et al. | 701/113 |
| 2013/0055743 A1* | 3/2013 | Ogasawara et al. | 62/156 |
| 2013/0317728 A1* | 11/2013 | Hall et al. | 701/113 |
| 2014/0032086 A1* | 1/2014 | Wijaya et al. | 701/112 |

FOREIGN PATENT DOCUMENTS

| | | |
|---|---|---|
| JP | 2009-138709 A | 6/2009 |
| JP | 2009-184626 A | 8/2009 |
| JP | 2010-030549 A | 2/2010 |
| JP | 4475437 B2 | 3/2010 |
| JP | 2010-281229 A | 12/2010 |
| WO | WO 2009/098903 A1 | 8/2009 |

* cited by examiner

F I G. 8
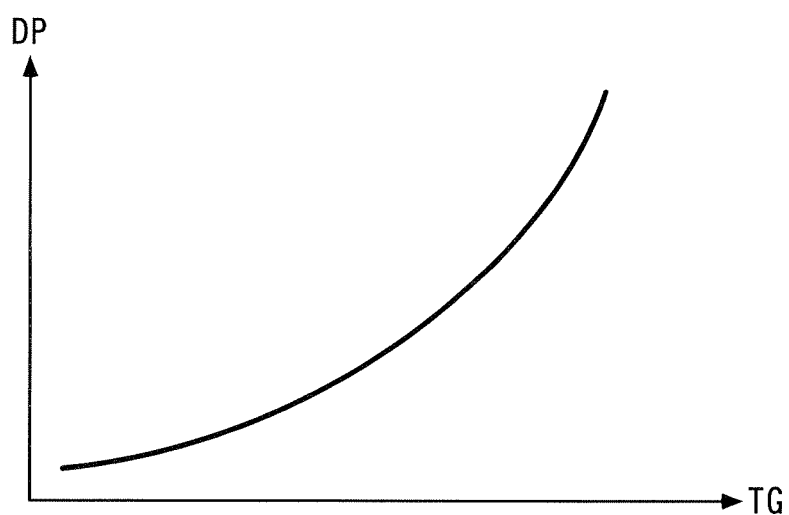

STOP CONTROL SYSTEM FOR INTERNAL COMBUSTION ENGINE

BACKGROUND OF THE INVENTION

1. Field of the Invention

The present invention relates to a stop control system for an internal combustion engine, which automatically stops and restarts the engine installed on a vehicle.

2. Description of the Related Art

Conventionally, as a stop control system for an internal combustion engine of this kind, one disclosed in Japanese Patent No. 4475437 is known. The engine is automatically stopped during stoppage of a vehicle when predetermined stop conditions (idle stop conditions) are satisfied. Further, the engine is connected to a compressor of an air conditioner via a crankshaft, and is used as a drive source of the compressor. This can cause the following inconveniences when the engine is stopped during a cooling operation of the air conditioner.

After stoppage of the engine, although the blowing of air into a vehicle compartment by an electric fan is continued, the circulation of refrigerant is stopped along with stoppage of the compressor, whereby the temperature of an evaporator starts to rise. Since air having passed through the evaporator is blown out into the vehicle compartment, the temperature of the air progressively rises as the temperature of the evaporator rises. Further, when the engine is stopped, dehumidification ceases to be performed, and humidity in the vehicle compartment starts to rise. When the humidity in the vehicle compartment becomes equal to or higher than a predetermined value, fogging of the window glass of the vehicle compartment occurs.

Therefore, in the stop control system disclosed in Japanese Patent No. 4475437, after the engine is automatically stopped, when a predetermined engine stoppage time period has elapsed, the engine is restarted. The engine stoppage time period is set in the following manner: First, an upper limit temperature (allowable upper limit temperature) of the evaporator of the air conditioner below which it is possible to maintain the comfort of vehicle occupants in the vehicle compartment is calculated according to the settings of the air conditioner and the external environment. Then, a time period (compartment temperature rise allowable time) over which the comfort of vehicle occupants in the vehicle compartment can be maintained is calculated based on the difference between the calculated allowable upper limit temperature and the temperature of the evaporator detected immediately before the stoppage of the engine. Next, a limit of humidity (fogging-determining humidity) below which fogging of window glass does not occur is calculated according to the settings of the air conditioner, temperature in the vehicle compartment, and the external environment, and fogging occurrence estimated time which is estimated to take before fogging of the window glass occurs is calculated based on the difference between the calculated fogging-determining humidity and humidity in the vehicle compartment detected immediately before the stoppage of the engine. Then, a smaller one of the calculated compartment temperature rise allowable time and fogging occurrence estimated time is set as the engine stoppage time period. Next, when the set engine stoppage time period has elapsed after the automatic stopping of the engine, the engine is restarted to thereby prevent both degradation of the comfort of vehicle occupants in the vehicle compartment and occurrence of fogging of the window glass.

As described above, in the stop control system disclosed in Japanese Patent No. 4475437, the fogging occurrence estimated time is calculated according to the settings of the air conditioner and the external environment, and the engine is restarted before the fogging occurrence estimated time has elapsed. However, conditions of occurrence of fogging of the window glass are not determined by the above-described parameters alone but vary with the temperature of the window glass where fogging actually occurs. Further, even if the temperature of the window glass at given time is the same, conditions of occurrence of fogging of the window glass are also different according to the environment in which the window glass has been placed up to the time.

However, in the conventional stop control system described above, the calculation of the fogging occurrence estimated time is merely performed according to the settings of the air conditioner and the external environment, which makes it impossible to accurately calculate the fogging occurrence estimated time. Therefore, when the fogging occurrence estimated time is calculated to be longer than actual fogging occurrence time, the restart of the engine is delayed to allow fogging of the window glass to occur. Inversely, when the fogging occurrence estimated time is calculated to be shorter, the engine is restarted quickly in a state where there is no fear of occurrence of fogging of the window glass, which degrades fuel economy.

SUMMARY OF THE INVENTION

It is an object of the present invention to provide a stop control system for an internal combustion engine, which is capable of restarting the engine automatically stopped, in optimum timing, thereby making it possible to positively prevent occurrence of fogging of window glass of a vehicle compartment and improve fuel economy.

To attain the above object, the present invention provides a stop control system for an internal combustion engine, which stops the engine installed on a vehicle and connected to a compressor of an air conditioner when predetermined stop conditions are satisfied, and restarts the engine when predetermined restart conditions are satisfied, comprising vehicle compartment humidity-detecting means for detecting a vehicle compartment humidity which is a humidity in a compartment of the vehicle in a state where the engine is stopped, window glass temperature-obtaining means for obtaining a window glass temperature which is a temperature of window glass of the compartment of the vehicle in the state where the engine is stopped, limit humidity-setting means for setting a limit of the vehicle compartment humidity below which fogging of the window glass does not occur, as a limit humidity, according to the obtained window glass temperature, and restart means for restarting the engine when the detected vehicle compartment humidity becomes not lower than the limit humidity.

This engine is installed on a vehicle, and is subjected to a so-called idle stop in which the engine is stopped when predetermined stop conditions are satisfied and is restarted when predetermined restart conditions are satisfied. Further, the engine is connected to the compressor of the air conditioner and is used as a drive source of the compressor. According to the stop control system for the engine, in a state where the engine is stopped, the humidity in the vehicle compartment is detected, and the temperature of window glass, such as a windshield, of the vehicle compartment is obtained. Further, a limit of vehicle compartment humidity below which fogging of the window glass does not occur is set as the limit humidity according to the obtained window glass temperature. When the vehicle compartment humidity becomes not lower than the limit humidity, the engine is restarted.

As described above, the conditions of occurrence of fogging of the window glass largely vary with the temperature of the window glass. Therefore, by setting the above-mentioned limit humidity according to the temperature of the window glass, it is possible to restart the engine in optimum timing according to an actual state of occurrence of fogging of the window glass. As a consequence, it is possible to properly prevent fogging of the window glass from occurring to ensure a time period over which the engine is stopped, to the greatest extent possible, thereby making it possible to improve fuel economy. As described above, it is possible to prevent fogging of the window glass from occurring and improve the fuel economy in a compatible manner.

Preferably, the stop control system further comprises weather-determining means for determining whether or not weather outside the vehicle compartment is rainy or snowy, and correction means for correcting one of the vehicle compartment humidity and the limit humidity when the determined weather is rainy or snowy.

With the configuration of the preferred embodiment, when it is determined that the weather outside the vehicle compartment is rainy or snowy, one of the vehicle compartment humidity and the limit humidity, which are compared with each other in order to determine timing for restarting the engine, is corrected. When the weather is rainy or snowy, moisture attached to clothes or a rainwear of a driver is evaporated in the vehicle compartment, so that humidity in the vehicle compartment is easy to rise, and accordingly fogging of the window glass is more likely to occur. Therefore, when the weather is rainy or snowy, if the above-described correction is performed, it is possible to restart the engine in the optimum timing even in a state where fogging of the window glass is more likely to occur due to rain or snow, thereby making it possible to more properly prevent fogging of the window glass from occurring.

Preferably, the stop control system further comprises vehicle compartment temperature-detecting means for detecting a vehicle compartment temperature which is a temperature in the compartment of the vehicle, vehicle speed-detecting means for detecting a vehicle speed which is a speed of the vehicle before the engine is stopped, outside air temperature-detecting means for detecting an outside air temperature which is a temperature of air outside the compartment of the vehicle, and window glass temperature-correcting means for correcting the window glass temperature for use in setting the limit humidity, according to the detected vehicle speed and the detected outside air temperature, when the detected vehicle compartment temperature is not lower than a predetermined temperature.

With the configuration of the preferred embodiment, the vehicle compartment temperature, the vehicle speed, and the outside air temperature are detected. When the detected vehicle compartment temperature is not lower than the predetermined temperature, the window glass temperature for use in setting the limit humidity is corrected according to the detected vehicle speed and outside air temperature. In a state where the vehicle compartment temperature is not lower than the predetermined temperature, the outside air temperature becomes relatively lower than the vehicle compartment temperature, which makes fogging of the window glass more likely to occur. Therefore, it is necessary to accurately calculate the limit humidity.

Now, the degree of a change in the window glass temperature before the restart of the engine after stoppage thereof is changed according to the vehicle speed and the outside air temperature. For example, as the vehicle speed before stoppage of the engine is higher, the degree by which the window glass is cooled by wind generated by traveling of the vehicle is higher, whereby the window glass is cooled to a deeper portion. Therefore, even if the surface temperature of the window glass at the time is the same, the degree of subsequent rise in the window glass temperature is small. Further, as the outside air temperature is higher, the amount of heat received by the window glass from the outside air is larger, which increases the degree of subsequent rise in the window glass temperature. Therefore, by correcting the window glass temperature according to the vehicle speed and the outside air temperature, it is possible to obtain an accurate window glass temperature favorably reflecting the vehicle speed and the outside air temperature thereon. Further, it is possible to more properly set the limit humidity by using the thus corrected window glass temperature and more properly set the timing for restarting the engine.

The above and other objects, features, and advantages of the present invention will become more apparent from the following detailed description taken in conjunction with the accompanying drawings.

BRIEF DESCRIPTION OF THE DRAWINGS

FIG. 8 is a diagram showing an example of a map for use in calculating the limit humidity.

DETAILED DESCRIPTION OF PREFERRED EMBODIMENTS

Figure 1:
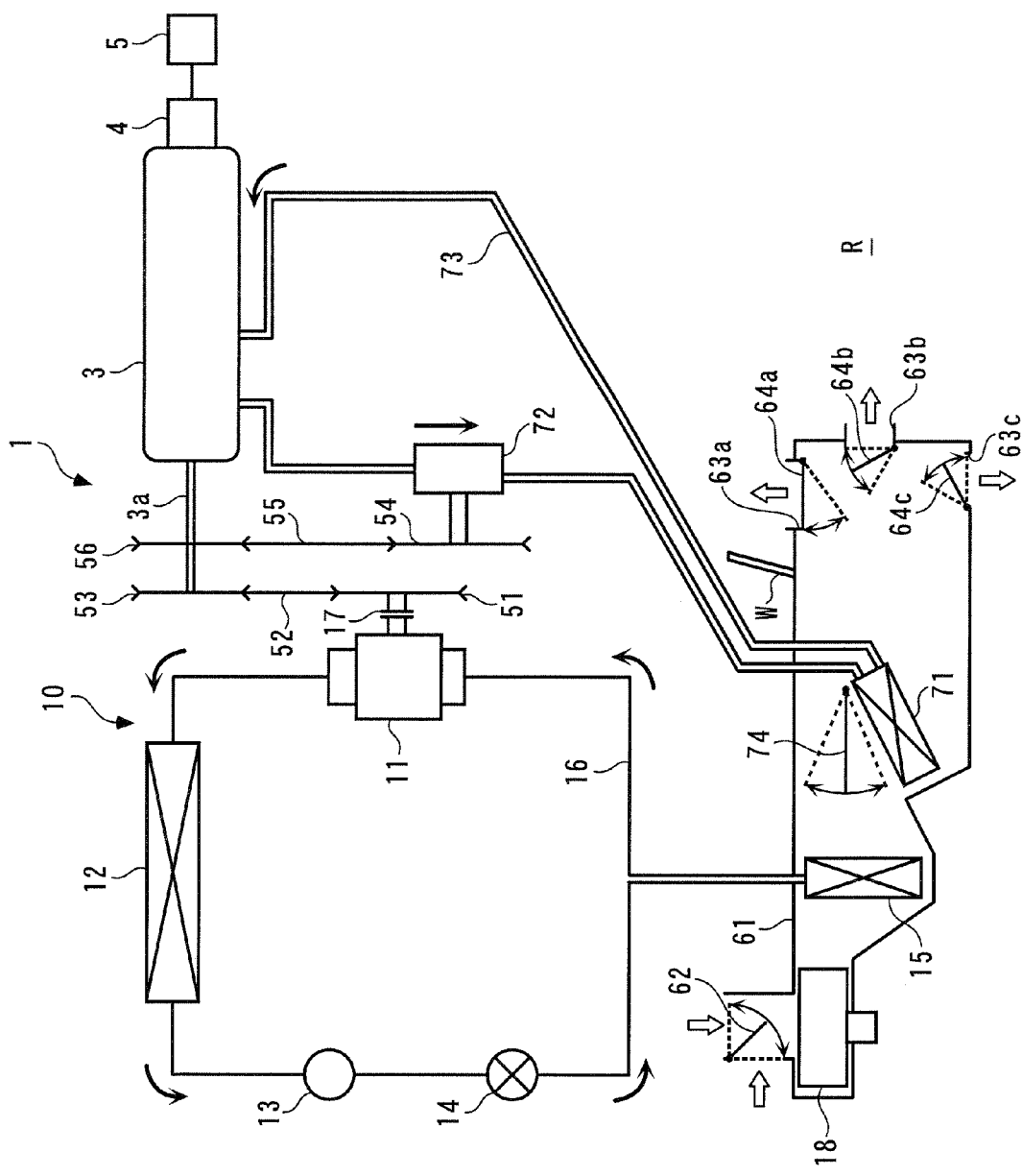
FIG. 1 is a schematic view of an internal combustion engine to which a stop control system according to an embodiment of the present invention is applied.
Figure 2:
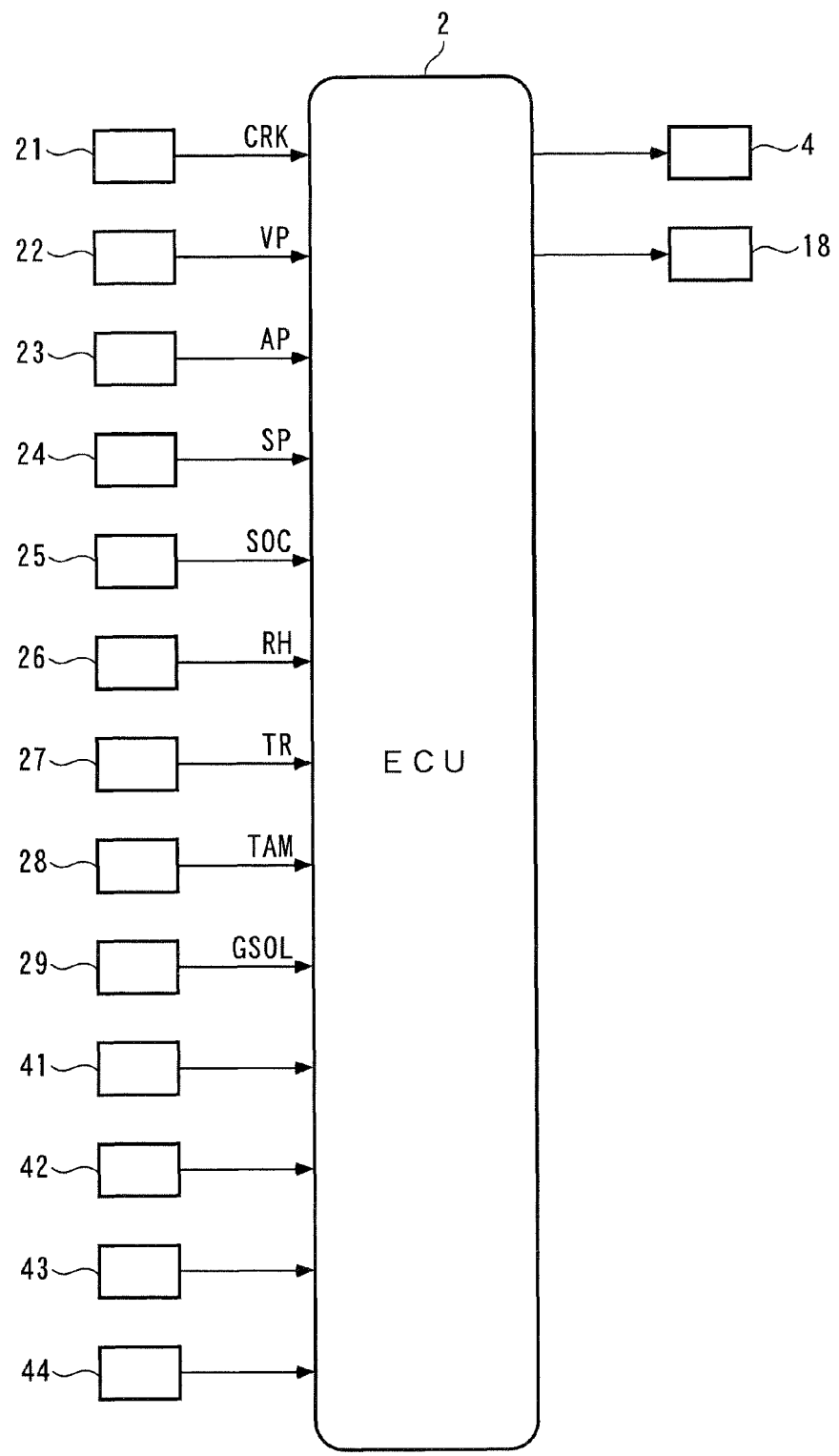
FIG. 2 is a block diagram of the stop control system.

The invention will now be described in detail with reference to drawings showing a preferred embodiment thereof. FIG. 1 schematically shows a stop control system 1 according to the present embodiment, together with an internal combustion engine (hereafter referred to as the "engine") 3 to which is applied the stop control system 1. The engine 3 is a gasoline engine installed on a vehicle (not shown).

An air conditioner 10 for cooling and heating a vehicle compartment R is mounted on the vehicle. The refrigeration cycle of this air conditioner 10 comprises a compressor 11, a condenser 12, a receiver 13, an expansion valve 14, an evaporator 15, and so forth.

The compressor 11 is connected to a crankshaft 3a of the engine 3 via an electromagnetic air conditioner clutch 17, a pulley 51, a belt 52, and a pulley 53. In a state having the air conditioner clutch 17 connected thereto, the compressor 11 is driven by the crankshaft 3a, and compresses low-temperature low-pressure gaseous refrigerant, for sending the same to the condenser 12 as high-temperature high-pressure gaseous refrigerant via a refrigerant pipe 16.

The compressor 11 is of a variable displacement type, and includes an electromagnetic control valve (not shown) for changing the capacity thereof. The capacity of the compressor 11 is controlled by a drive signal delivered from an ECU 2 to the electromagnetic control valve.

The engagement and disengagement of the above-describe air conditioner clutch 17 is controlled by the ECU 2 e.g. according to the operating state of an air conditioner switch 41 provided for a driver's seat of the vehicle compartment R. Specifically, when the air conditioner switch 41 is off, the air conditioner clutch 17 is disengaged, whereby a cooling operation of the air conditioner 10 is stopped. On the other hand, when the air conditioner switch 41 is on, the engagement and disengagement of the air conditioner clutch 17 is controlled such that a temperature TR in the vehicle compartment R (hereinafter referred to as the "compartment temperature TR") becomes equal to a target temperature.

The condenser 12 cools and liquefies the high-temperature high-pressure gaseous refrigerant sent from the compressor 11. The liquefied refrigerant is sent to the receiver 13 via the refrigerant pipe 16. The receiver 13 is for temporarily storing the refrigerant. Refrigerant having flowed out from the receiver 13 has moisture removed therefrom by a dryer (not shown), and is then sent to the expansion valve 14. The expansion valve 14 expands the refrigerant in an atomized state and sends the same to the evaporator 15 via the refrigerant pipe 16.

The evaporator 15 is disposed within an air conditioner casing 61 communicating with the vehicle compartment R. The temperature of the atomized refrigerant sent from the expansion valve 14 to the evaporator 15 is raised by heat exchange with air within the air conditioner casing 61, and the refrigerant is evaporated (vaporized). The vaporized refrigerant is returned to the compressor 11 via the refrigerant pipe 16.

The air within the air conditioner casing 61 is cooled by heat exchange with the refrigerant within the evaporator 15, and is then blown out from blowout ports 63a to 63c into the vehicle compartment R by a fan 18 disposed at the inlet of the air conditioner casing 61, whereby the vehicle compartment R is cooled. Further, the air within the air conditioner casing 61 is cooled by the evaporator 15 to condense moisture therein into water, and the dried air is sent into the vehicle compartment R to thereby dehumidify the vehicle compartment R.

The above-mentioned fan 18 is operated and stopped by turning on and off the air conditioner switch 41. Further, the blowout ports 63a to 63c are provided with a differential door 64a, a vent door 64b, and a floor door 64c, which are pivotally movable and are operated for opening and closing the blowout ports 63a to 63c, respectively. The differential door 64a, the vent door 64b and the floor door 64c are opened and closed by a blowout switch (not shown) provided for the driver's seat.

A heater core 71 is disposed in the air conditioner casing 61 at a location downstream of the evaporator 15. The heater core 71 is supplied with high-temperature engine coolant having cooled the engine 3, via a circulation path 73 by a water pump 72, whereby the temperature of the heater core 71 is raised. The water pump 72 is connected to the crankshaft 3a via a pulley 54, a belt 55, and a pulley 56, and is always driven by the crankshaft 3a during operation of the engine 3. Air within the air conditioner casing 61, after being heated by the heater core 71, is blown out from the blowout ports 63a to 63c into the vehicle compartment R by the fan 18, whereby the vehicle compartment R is heated.

Further, a pivotally-movable air mix door 74 is disposed within the air conditioner casing 61 at a location immediately upstream of the heater core 71. The degree of opening of the air mix door 74 is changed by an actuator (not shown). This changes a ratio between the amount of cooled air from the evaporator 15 and the amount of air introduced into and heated by the heater core 71, whereby the temperature of air blown out into the vehicle compartment R adjusted.

Further, a pivotally-movable intake door 62 is disposed at the inlet of the air conditioner casing 61. This intake door 62 is for switching between inside air introduction for introducing air from the vehicle compartment R into the air conditioner casing 61 and outside air introduction for introducing outside air into the air conditioner casing 61. The switching is performed using a switching lever (not shown) provided for the driver's seat.

The crankshaft 3a of the engine 3 is provided with a crank angle sensor 21. The crank angle sensor 21 delivers a CRK signal, which is a pulse signal, to the ECU 2 along with rotation of the crankshaft 3a, whenever the crankshaft 3a rotates through a predetermined angle (e.g. 30°). The ECU 2 calculates a rotational speed NE of the engine 3 (hereafter referred to as the "engine speed NE") based on the CRK signal.

Further, delivered to the ECU 2 are a detection signal indicative of a vehicle speed VP, which is the speed of the vehicle, from a vehicle speed sensor 22, a detection signal indicative of a degree AP of opening of an accelerator pedal (not shown) (hereafter referred to as the "accelerator pedal opening AP"), from an accelerator pedal opening sensor 23, and a detection signal indicative of one of shift positions (L, 2, D, N, R, and P) of a shift lever (not shown), from a shift position sensor 24.

Further, delivered to the ECU 2 are a detection signal indicative of a humidity RH in the vehicle compartment R (hereinafter referred to as the "compartment humidity RH") from a humidity sensor 26, a detection signal indicative of the compartment temperature TR from a compartment temperature sensor 27, a detection signal indicative of a temperature TAM of outside air (hereafter referred to as the "outside air temperature TAM") from an outside air temperature sensor 28, and a detection signal indicative of an amount GSOL of solar radiation (hereafter referred to as the "solar radiation amount GSOL") received by window glass W, such as a windshield, from a solar radiation sensor 29.

Furthermore, detection signals indicative of current and voltage input to and output from a battery 5, which is a power source of a starter 4, are delivered to the ECU 2 from a current-voltage sensor 25. The ECU 2 calculates a remaining charge SOC of the battery 5 (hereafter referred to as the "battery remaining charge SOC") based on the detection signals.

Further, a detection signal indicative of an on/off state of an ignition switch 42 is delivered from the ignition switch 42 to the ECU 2. Note that when the ignition switch 42 is turned on during stoppage of the engine 3, the starter 4 connected to the crankshaft 3a is operated, whereby the engine 3 is cranked and started. Further, when the ignition switch 42 is turned off during operation of the engine 3, the engine 3 is stopped.

Furthermore, delivered to the ECU 2 are a detection signal indicative of an on/off state of a brake pedal (not shown) from a brake switch 43, and a detection signal indicative of an on/off state of a wiper (not shown) from a wiper switch 44.

Further, the ECU 2 is implemented by a microcomputer (not shown) comprising a CPU, a RAM, a ROM, and an input interface (none of which are shown). The ECU 2 performs various computing operations based on the detection signals from the aforementioned sensors 21 to 29 and switches 41 to 44 according to control programs stored in the ROM. Note that in the present embodiment, the ECU 2 corresponds to window glass temperature-obtaining means, limit humidity-setting means, restart means, correction means, and window glass temperature-correcting means.

Next, a stop control process of the engine 3 according to the present embodiment will be described with reference to FIGS. 3 to 8. Note that processes described hereafter are executed whenever a predetermined time period elapses.

Figure 3:
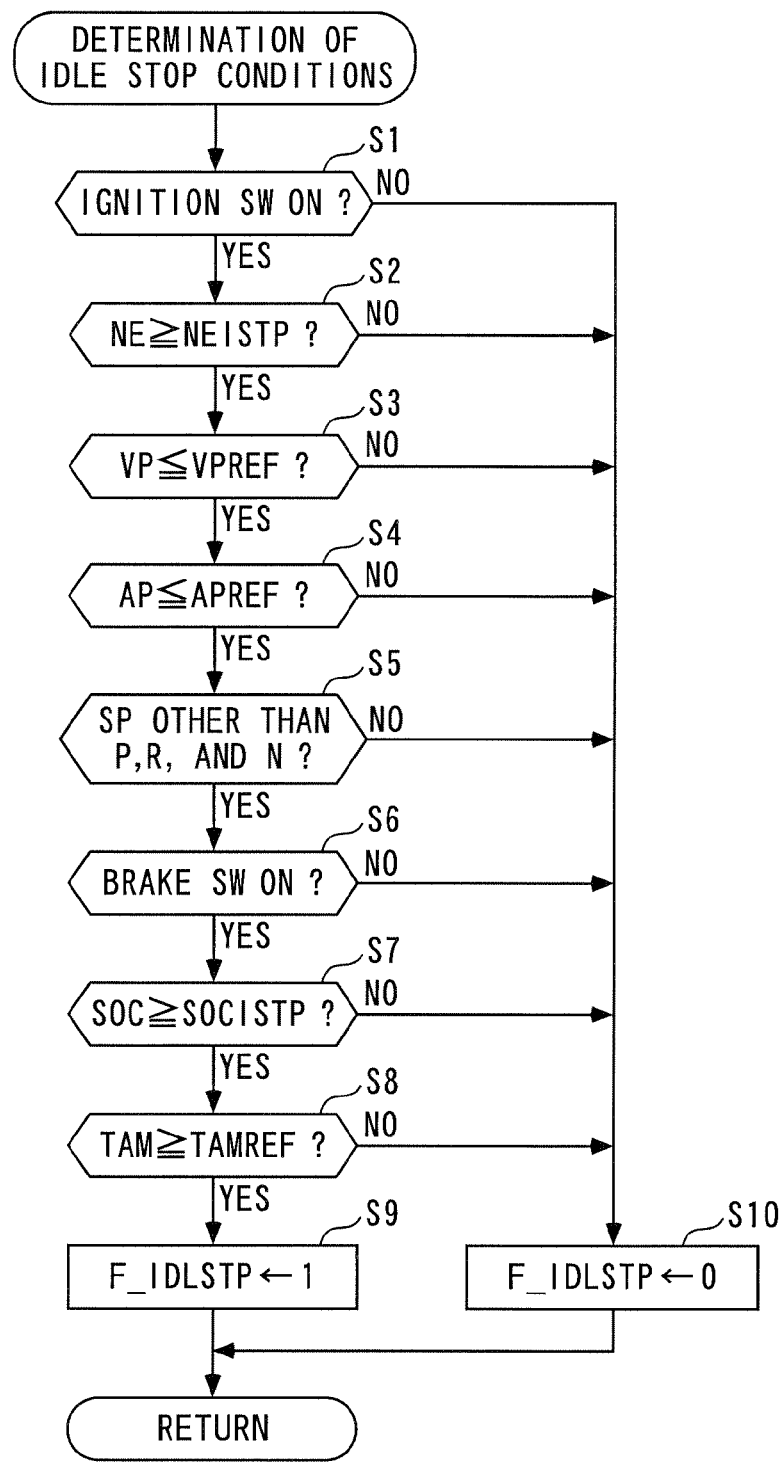
FIG. 3 is a flowchart of a process for determining whether or not idle stop conditions are satisfied.

FIG. 3 shows a process for determining whether or not idle stop conditions are satisfied. In the present process, first, in steps 1 to 8, it is determined whether or not the following conditions (a) to (h) are satisfied, respectively.

(a) The ignition switch (SW) 42 is on.
(b) The engine speed NE is not lower than a predetermined value NEISTP.
(c) The vehicle speed VP is not higher than a predetermined value VPREF.
(d) The accelerator pedal opening AP is not larger than a predetermined value APREF.
(e) The shift position (SP) is other than P, R, and N.
(f) The brake switch (SW) 43 is on.
(g) The battery remaining charge SOC is not lower than a predetermined value SOCISTP.
(h) The outside air temperature TAM is not lower than a predetermined temperature TAMREF.

If all of these conditions (a) to (h) are satisfied, it is determined that the idle stop conditions are satisfied, and to indicate the fact, in a step 9, an idle stop flag F_IDLSTP is set to 1, followed by terminating the present process. When the idle stop flag F_IDLSTP is set to 1 during operation of the engine 3, an idle stop for automatically stopping the engine 3 is started.

On the other hand, if any of the answers to the respective questions of the steps 1 to 8, is negative (NO), i.e. if any of the conditions (a) to (h) is not satisfied, it is determined that the idle stop conditions are not satisfied, and to indicate the fact, in a step 10, the idle stop flag F_IDLSTP is set to 0, followed by terminating the present process. When the idle stop flag F_IDLSTP is set to 0 during the idle stop of the engine 3, the idle stop is terminated, followed by restarting the engine 3.

Figure 4:
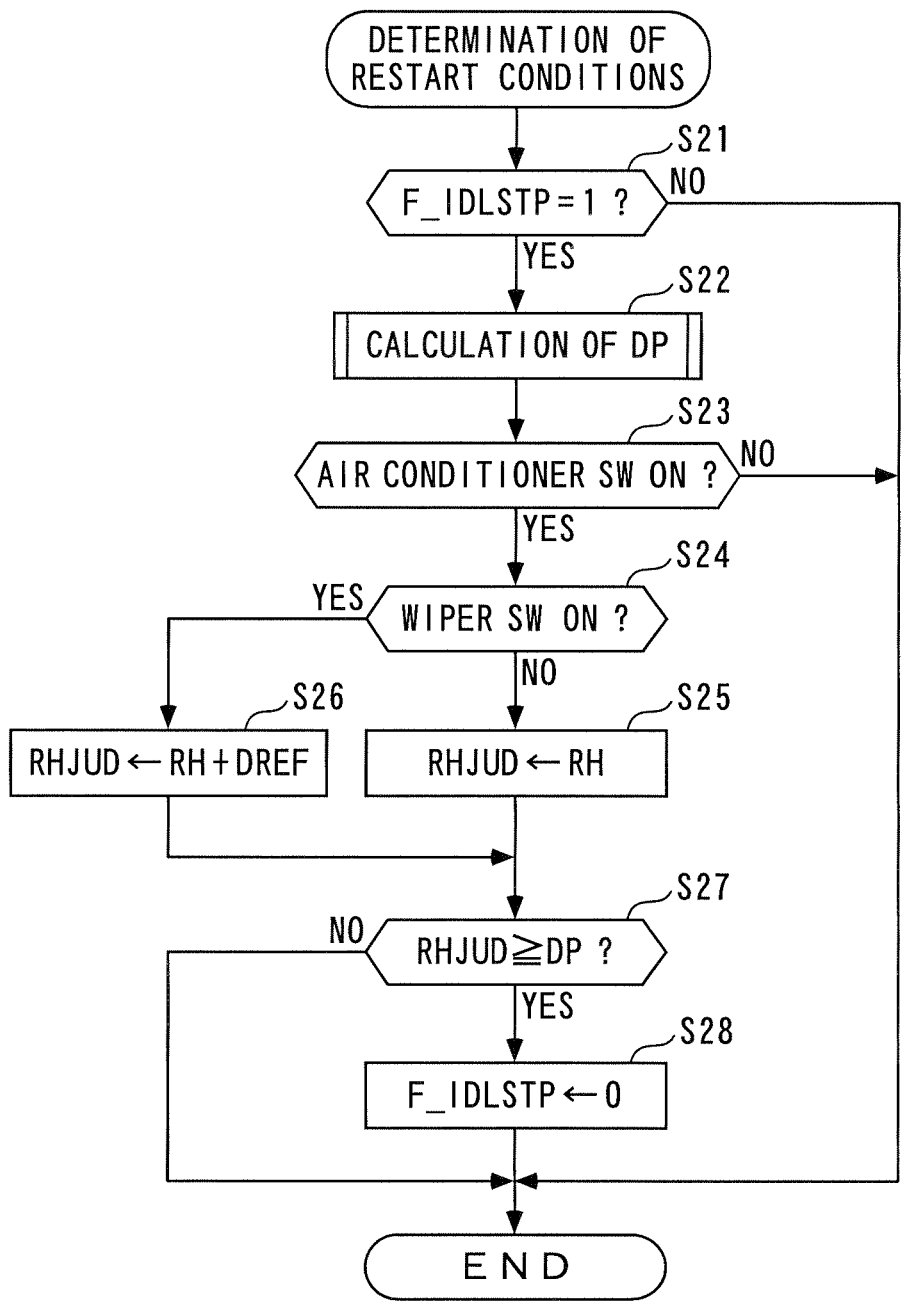
FIG. 4 is a flowchart of a process for determining whether or not restart conditions are satisfied.

FIG. 4 shows a process for determining whether or not restart conditions for restarting the engine 3 are satisfied. Besides the fact the idle stop conditions are not satisfied, the present process is executed for determining whether the restart conditions are satisfied, so as to prevent fogging of the window glass W from occurring during the idle stop. In the present process, first, it is determined in a step 21 whether or not the idle stop flag F_IDLSTP is equal to 1. If the answer to this question is negative (NO), i.e. if it is not during the idle stop, the present process is immediately terminated. On the other hand, if the answer to the question of the step 21 is affirmative (YES), i.e. if it is during the idle stop, in a step 22, a limit humidity DP is calculated. The limit humidity DP is a limit of compartment humidity below which fogging of the window glass W does not occur.

Figure 5:
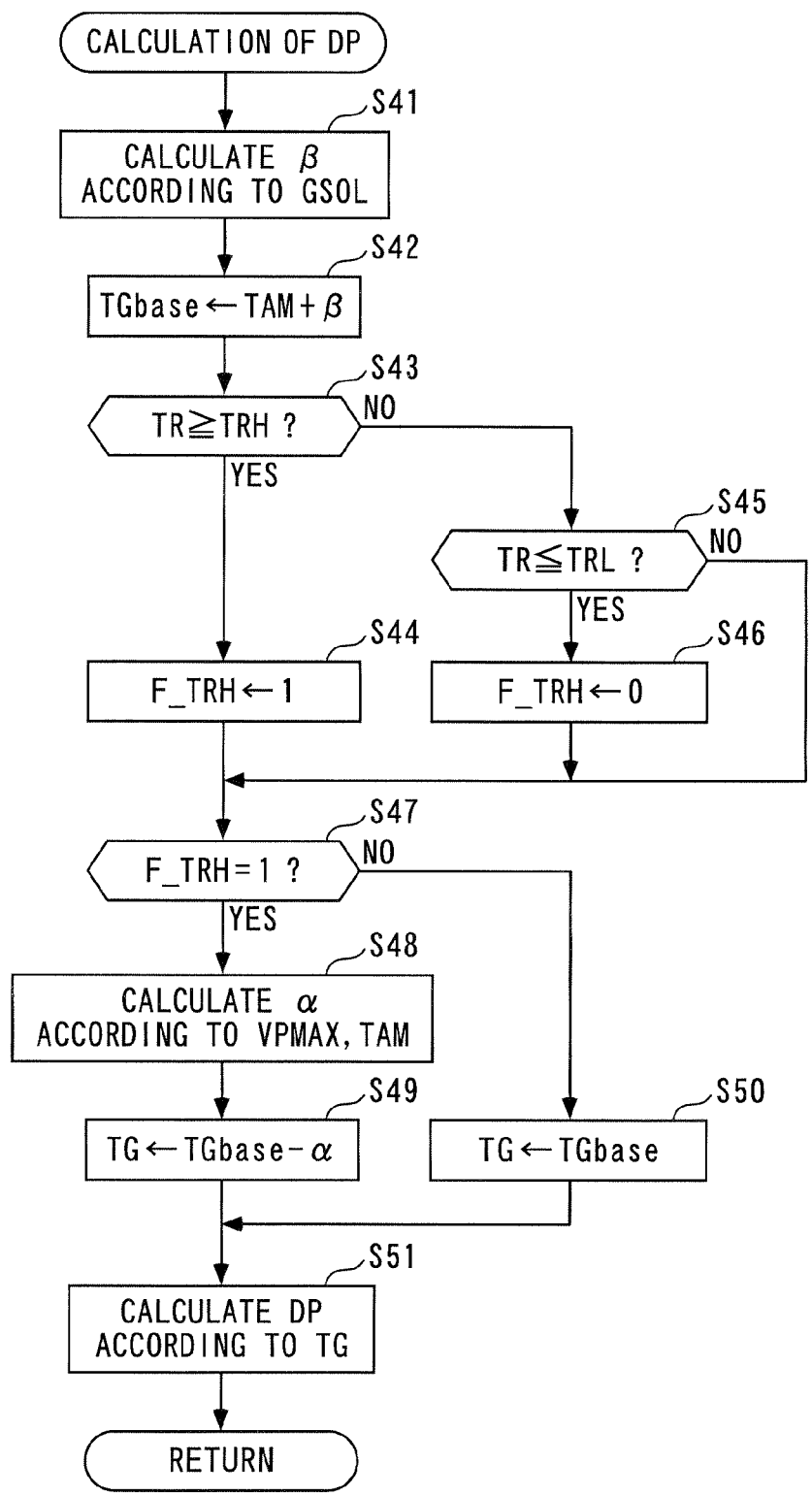
FIG. 5 is a flowchart of a process for calculating a limit humidity.
Figure 6:
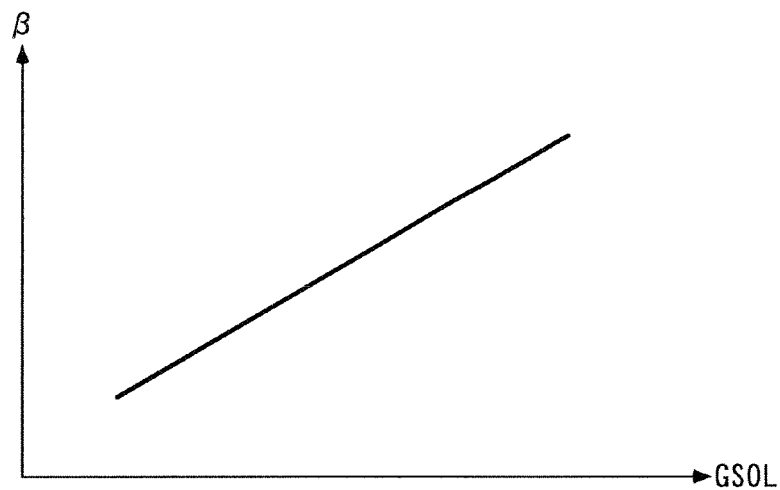
FIG. 6 is a diagram showing an example of a map for use in calculating a solar radiation amount-dependent correction term.

FIG. 5 shows a subroutine of this process. In the present process, first, in a step 41, a solar radiation amount-dependent correction term β is calculated by searching a map shown in FIG. 6 according to a detected value of the solar radiation amount GSOL. In this map, the solar radiation amount-dependent correction term β is set to a larger value as the solar radiation amount GSOL is larger. This is because as the solar radiation amount GSOL is larger, the amount of heat received by the window glass W becomes larger and a window glass temperature TG during the idle stop becomes higher. Next, in a step 42, a basic value TGbase of the window glass temperature is calculated by adding the calculated solar radiation amount-dependent correction term β to the outside air temperature TAM.

Next, in a step 43, it is determined whether or not a detected value of the compartment temperature TR is not lower than a first predetermined temperature TRH. The first predetermined temperature TRH is set to a temperature (e.g. 25° C.) higher than normal temperature. If the answer to this question is affirmative (YES), in a step 44, a compartment temperature flag F_TRH is set to 1, and then the process proceeds to a step 47, referred to hereinafter.

On the other hand, if the answer to the question of the step 43 is negative (NO), i.e. if TR<TRH holds, in a step 45, it is determined whether or not the compartment temperature TR is not higher than a second predetermined temperature TRL (e.g. 15° C.) lower than the first predetermined temperature TRH. If the answer to this question is affirmative (YES), in a step 46, the compartment temperature flag F_TRH is set to 0, and the process proceeds to the step 47, whereas if the answer to the question of the step 45 is negative (NO), i.e. if TRL<TR<TRH holds, the process directly proceeds to the step 47. That is, if TRL<TR<TRH holds, the compartment temperature flag F_TRH is maintained at the value in the immediately preceding loop.

In the step 47 following one of the above-described steps 44 to 46, it is determined whether or not the compartment temperature flag F_TRH is equal to 1. If the answer to this question is negative (NO), in a step 50, the basic value TGbase calculated in the step 42 is set as the window glass temperature TG, and then the process proceeds to a step 51, referred to hereinafter.

Figure 7:
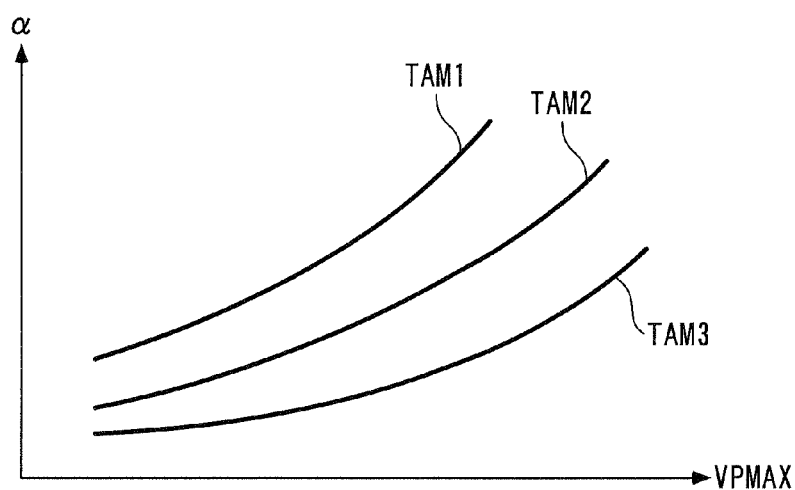
FIG. 7 is a diagram showing an example of a map for use in calculating a traveling state-dependent correction term.

On the other hand, if the answer to the question of the step 47 is affirmative (YES), i.e. if the compartment temperature flag F_TRH is equal to 1, in a step 48, a traveling state-dependent correction term α is calculated by searching a map shown in FIG. 7 according to a vehicle speed maximum value VPMAX and the outside air temperature TAM. The vehicle speed maximum value VPMAX is a maximum value of the vehicle speed VP detected during traveling of the vehicle before the current idle stop, and is calculated by a predetermined process (not shown) separate from the present process.

In the FIG. 7 map, the traveling state-dependent correction term α is set with respect to three predetermined outside air temperatures TAM1 to TAM3 (TAM1<TAM2<TAM3) such that it is set to a larger value as the outside air temperature TAM is lower. This is because as the outside air temperature TAM is lower, the amount of heat received by the window glass W becomes smaller, and the window glass temperature TG during the idle stop becomes lower. Further, the traveling state-dependent correction term α is set with respect to each of the outside air temperatures TAM1 to TAM3 such that it is set to a larger value as the vehicle speed maximum value VPMAX is higher. This is because as the vehicle speed VP is higher, the degree by which the window glass W is cooled by wind generated by traveling of the vehicle is higher, whereby the window glass W is cooled to a deeper portion, and the degree of subsequent rise in the temperature of the window glass W is smaller even if the surface temperatures of the window glass W at the time is the same. Note that when the outside air temperature TAM is not equal to any of the above-mentioned three values TAM1 to TAM3, the traveling state-dependent correction term α is calculated by interpolation.

Next, in a step 49, a value obtained by subtracting the traveling state-dependent correction term α from the basic value TGbase (=TGbase−α) is set as the window glass temperature TG, and then the process proceeds to the step 51.

In the step 51 following the step 49 or 50, the limit humidity DP is calculated by searching a map shown in FIG. 8 according to the window glass temperature TG, followed by terminating the present process. In this map, the limit humidity DP is set to a larger value as the window glass temperature TG is higher. This is because as the window glass temperature TG is higher, the dew-point temperature of the window glass W is higher, which makes fogging of the window glass W difficult to occur.

Referring again to FIG. 4, in a step 23 following the step 22, it is determined whether or not the air conditioner switch (SW) 41 is on. If the answer to this question is negative (NO), i.e. if the air conditioner switch 41 is off, the present process is immediately terminated. This is because even when the engine 3 is restarted, if the air conditioner switch 41 is off, dehumidification of the vehicle compartment R is not performed, and hence fogging of the window glass W cannot be prevented.

On the other hand, if the answer to the question of the step 23 is affirmative (YES), i.e. if the air conditioner switch 41 is on, it is determined in a step 24 whether or not the wiper switch (SW) 44 is on. If the answer to this question is negative (NO), it is judged that the weather outside the vehicle compartment R is not rainy or snowy, and in a step 25, a detected value of the compartment humidity RH is set as a determining compartment humidity RHJUD. On the other hand, if the answer to the question of the step 24 is affirmative (YES), it is judged that the weather outside the vehicle compartment R is rainy or snowy, and in a step 26, a value corrected by adding a predetermined value DREF (>0) to the compartment humidity RH (=RH+DREF) is set as the determining compartment humidity RHJUD.

In a step 27 following the step 25 or 26, it is determined whether or not the determining compartment humidity RHJUD is not lower than the limit humidity DP calculated in the step 22. If the answer to this question is negative (NO), i.e. if RHJUD<DP holds, it is determined that the compartment humidity RH is in a critical state in which fogging of the window glass W occurs, and hence the present process is immediately terminated to continue the idle stop.

On the other hand, if the answer to the question of the step 27 is affirmative (YES), i.e. if RHJUD≥DP holds, it is determined that the compartment humidity RH is not in the critical state in which fogging of the window glass W occurs, and in a step 28, the idle stop flag F_IDLSTP is set to 0, followed by terminating the present process. As described hereinabove, when the idle stop flag F_IDLSTP is set to 0, the engine 3 is restarted, and accordingly dehumidification by the air conditioner 10 is resumed to thereby prevent occurrence of fogging of the window glass W.

As described heretofore, according to the present embodiment, the limit humidity DP is set according to the window glass temperature TG during the idle stop, and when the determining compartment humidity RHJUD becomes equal to or higher than the limit humidity DP, the idle stop is terminated and the engine 3 is restarted. Therefore, it is possible to restart the engine 3 in optimum timing according to an actual state of occurrence of fogging of the window glass W. This makes it possible to properly prevent occurrence of fogging of the window glass W and ensure a time period over which the engine 3 is stopped, to the greatest extent possible, thereby making it possible to improve fuel economy. As described above, it is possible to attain prevention of occurrence of fogging of the window glass W and improvement of fuel economy in a compatible manner.

Further, when the weather is rainy or snowy, the value corrected by adding the predetermined value DREF to the compartment humidity RH is used as the determining compartment humidity RHJUD, so that it is possible to restart the engine 3 in optimum timing even in a state where fogging of the window glass W is more likely to occur due to rain or snow, thereby making it possible to more properly prevent occurrence of fogging of the window glass W.

Furthermore, the traveling state-dependent correction term $\alpha$ is calculated according to the vehicle speed maximum value VPMAX and the solar radiation amount GSOL when the compartment temperature TR is not lower than the first predetermined temperature TRH, and the window glass temperature TG is calculated using the calculated traveling state-dependent correction term $\alpha$. This makes it possible to obtain an accurate window glass temperature TG favorably reflecting the vehicle speed maximum value VPMAX and the solar radiation amount GSOL thereon. Further, it is possible to more properly set the limit humidity DP using the thus calculated window glass temperature TG to thereby more properly set the timing for restarting the engine 3.

Note that the present invention is by no means limited to the embodiment described above, but can be practiced in various forms. For example, although in the above-described embodiment, the window glass temperature TG is calculated according to the outside air temperature TAM, the window glass temperature TG may be directly detected instead of this.

Further, although in the above-described embodiment, the compartment humidity RH is corrected when the weather is rainy or snowy, the limit humidity DP may be corrected instead of the compartment humidity RH. Further, although in the above-described embodiment, it is determined whether the weather is rainy or snowy, according to the on/off state of the wiper switch 44, instead of this, after detecting humidity outside the vehicle compartment R or the amount of water droplets attached to the window glass W, the determination of the weather may be performed according to the results of the detection.

Further, although in the above-described embodiment, the vehicle speed maximum value VPMAX before the idle stop is used as a vehicle speed for calculating the traveling state-dependent correction term $\alpha$ that corrects the window glass temperature TG, the vehicle speed maximum value VPMAX may be replaced e.g. by an average value of the vehicle speed VP.

Furthermore, although in the above-described embodiment, the present invention is applied to the gasoline engine installed on a vehicle, this is not limitative, but it can be applied to various engines other than the gasoline engine, e.g. a diesel engine, and further, it can be applied to engines other than the engines for a vehicle, e.g. engines for ship propulsion machines, such as an outboard motor having a vertically-disposed crankshaft. Further, it is possible to change details of the construction of the embodiment within the spirit and scope of the present invention.

It is further understood by those skilled in the art that the foregoing are preferred embodiments of the invention, and that various changes and modifications may be made without departing from the spirit and scope thereof.

What is claimed is:

1. A stop control system for an internal combustion engine, which stops the engine installed on a vehicle and connected to a compressor of an air conditioner when predetermined stop conditions are satisfied, and restarts the engine when predetermined restart conditions are satisfied, comprising:

vehicle compartment humidity-detecting means for detecting a vehicle compartment humidity which is a humidity in a compartment of the vehicle in a state where the engine is stopped;

window glass temperature-obtaining means for obtaining a window glass temperature which is a temperature of window glass of the compartment of the vehicle in the state where the engine is stopped;

limit humidity-setting means for setting a limit of the vehicle compartment humidity below which fogging of the window glass does not occur, as a limit humidity, according to the obtained window glass temperature;

vehicle compartment temperature-detecting means for detecting a vehicle compartment temperature which is a temperature in the compartment of the vehicle;

window glass temperature-correcting means for correcting the window glass temperature for use in setting the limit humidity when the detected vehicle compartment temperature is not lower than a predetermined temperature; and restart means for restarting the engine when the detected vehicle compartment humidity becomes not lower than the limit humidity.

2. The stop control system as claimed in claim 1, further comprising:

weather-determining means for determining whether or not weather outside the vehicle compartment is rainy or snowy; and correction means for correcting one of the vehicle compartment humidity and the limit humidity when the determined weather is rainy or snowy.

3. The stop control system as claimed in claim 1, further comprising:

vehicle speed-detecting means for detecting a vehicle speed which is a speed of the vehicle before the engine is stopped;

outside air temperature-detecting means for detecting an outside air temperature which is a temperature of air outside the compartment of the vehicle; and wherein the window glass temperature-correcting means executes the correction of the window glass temperature according to the detected vehicle speed and the detected outside air temperature.

4. The stop control system as claimed in claim 2, further comprising:

vehicle speed-detecting means for detecting a vehicle speed which is a speed of the vehicle before the engine is stopped;

outside air temperature-detecting means for detecting an outside air temperature which is a temperature of air outside the compartment of the vehicle; and wherein the window glass temperature-correcting means executes the correction of the window glass temperature according to the detected vehicle speed and the detected outside air temperature.

5. The stop control system as claimed in claim 4, wherein the window glass temperature-correcting means uses one of a maximum value of the vehicle speed before the engine is stopped, and an average value of the vehicle speed before the engine is stopped, as the vehicle speed.

6. The stop control system as claimed in claim 3, wherein the window glass temperature-correcting means uses one of a maximum value of the vehicle speed before the engine is stopped, and an average value of the vehicle speed before the engine is stopped, as the vehicle speed.

7. The stop control system as claimed in claim 1, wherein the window glass temperature-obtaining means is configured to directly detect the window glass temperature.

8. A stop control system for an internal combustion engine, which stops the engine installed on a vehicle and connected to a compressor of an air conditioner when predetermined stop conditions are satisfied, and restarts the engine when predetermined restart conditions are satisfied, comprising:

a humidity sensor configured to detect a vehicle compartment humidity which is a humidity in a compartment of the vehicle in a state where the engine is stopped;

a compartment temperature sensor configured to detect a vehicle compartment temperature which is a temperature in the compartment of the vehicle; and an electronic control unit programmed to:

obtain a window glass temperature which is a temperature of window glass of the compartment of the vehicle in the state where the engine is stopped;

limit humidity-setting means for setting a limit of the vehicle compartment humidity below which fogging of the window glass does not occur, as a limit humidity, according to the obtained window glass temperature;

correct the window glass temperature for use in setting the limit humidity when the detected vehicle compartment temperature is not lower than a predetermined temperature; and restart the engine when the detected vehicle compartment humidity becomes not lower than the limit humidity.

9. The stop control system as claimed in claim 8, wherein:

the electronic control unit is further programmed to determine whether or not weather outside the vehicle compartment is rainy or snowy and correct one of the vehicle compartment humidity and the limit humidity when the determined weather is rainy or snowy.

10. The stop control system as claimed in claim 8, further comprising:

a vehicle speed sensor configured to detect a vehicle speed which is a speed of the vehicle before the engine is stopped;

an outside air temperature sensor configured to detect an outside air temperature which is a temperature of air outside the compartment of the vehicle;

wherein the electronic control unit is further programmed to execute the correction of the window glass temperature according to the detected vehicle speed and the detected outside air temperature.

11. The stop control system as claimed in claim 9, further comprising:

a vehicle speed sensor configured to detect a vehicle speed which is a speed of the vehicle before the engine is stopped;

an outside air temperature sensor configured to detect an outside air temperature which is a temperature of air outside the compartment of the vehicle; and wherein the electronic control unit is further programmed to execute the correction of the window glass temperature according to the detected vehicle speed and the detected outside air temperature.

12. The stop control system as claimed in claim 11, wherein the electronic control unit is programmed to use one of a maximum value of the vehicle speed before the engine is stopped, and an average value of the vehicle speed before the engine is stopped, as the vehicle speed.

13. The stop control system as claimed in claim 10, wherein the electronic control unit is programmed to use one of a maximum value of the vehicle speed before the engine is stopped, and an average value of the vehicle speed before the engine is stopped, as the vehicle speed.

14. The stop control system as claimed in claim 8, wherein the electronic control unit is programmed to obtain the window glass temperature by directly detecting the window glass temperature.

\* \* \* \* \*